US007383356B2

(12) United States Patent
Gargi

(10) Patent No.: US 7,383,356 B2
(45) Date of Patent: Jun. 3, 2008

(54) DIGITAL MEDIA DISTRIBUTION METHODS, GENERAL PURPOSE COMPUTERS, AND DIGITAL MEDIA DISTRIBUTION SYSTEMS

(75) Inventor: Ullas Gargi, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 10/427,310

(22) Filed: Apr. 30, 2003

(65) Prior Publication Data
US 2004/0230699 A1    Nov. 18, 2004

(51) Int. Cl.
*G06F 15/16* (2006.01)
*G06F 15/173* (2006.01)

(52) U.S. Cl. .................. 709/246; 709/203; 709/209; 709/218; 709/240

(58) Field of Classification Search .............. 709/217, 709/218, 219, 231, 235, 246, 104; 710/262; 725/86
See application file for complete search history.

(56) References Cited

U.S. PATENT DOCUMENTS

| 6,037,994 | A | 3/2000 | Bae |
| 6,191,760 | B1 | 2/2001 | Jun et al. |
| 6,223,201 | B1* | 4/2001 | Reznak ................. 718/102 |
| 6,633,940 | B1* | 10/2003 | Alasti et al. ............ 710/262 |
| 6,922,730 | B1* | 7/2005 | Yaple .................... 709/235 |
| 7,142,934 | B2* | 11/2006 | Janik .................... 709/217 |
| 2001/0032235 | A1 | 10/2001 | Mandany et al. |
| 2001/0047516 | A1* | 11/2001 | Swain et al. ............. 725/86 |
| 2002/0013852 | A1* | 1/2002 | Janik ..................... 709/231 |
| 2002/0103880 | A1* | 8/2002 | Konetski et al. ........ 709/218 |
| 2003/0120706 | A1* | 6/2003 | Harjula ................. 709/104 |
| 2004/0133657 | A1* | 7/2004 | Smith et al. ............ 709/219 |
| 2006/0242325 | A1* | 10/2006 | Ramaswamy et al. ...... 709/246 |

OTHER PUBLICATIONS

"IEEE Spectrum Online, Digital Hubbub": http://www.spectrum.ieee.org; Sep. 26, 2002; 7 pps.
"Interface.TI.com; Platforms Link Entertainment Devices at Home"; http://www.eetimes.com/printableArticle?doc_id=OEG20020108S0056.html; Aug. 1, 2002; 3 pps.
"Application Program Sharing Systems, processing Devices, And Application Program Sharing Methods"; U.S. Appl. No. 10/232,443; Filed Aug. 29, 2002; Ullas Gargi.
"Internet Applicances Struggle for Acceptance"; George Lawton; Industry Standards, Computer; Jul. 2001; pp. 12-15.

* cited by examiner

*Primary Examiner*—Quang N. Nguyen

(57) ABSTRACT

Digital media distribution methods, general purpose computers, digital media distribution systems are described. According to one aspect, a digital media distribution method includes providing a general purpose computer configured to execute a plurality of application programs according to a first priority level, executing one of the application programs according to a second priority level using the general purpose computer, wherein the second priority level is higher than the first priority level and the executing comprises executing to process encoded data of at least one of a plurality of media formats to provide media data, providing the media data within a predetermined media format using the general purpose computer, and outputting the media data of the predetermined media format from the general purpose computer for communication to a plurality of media appliance devices configured to process the media data of the predetermined media format.

43 Claims, 7 Drawing Sheets

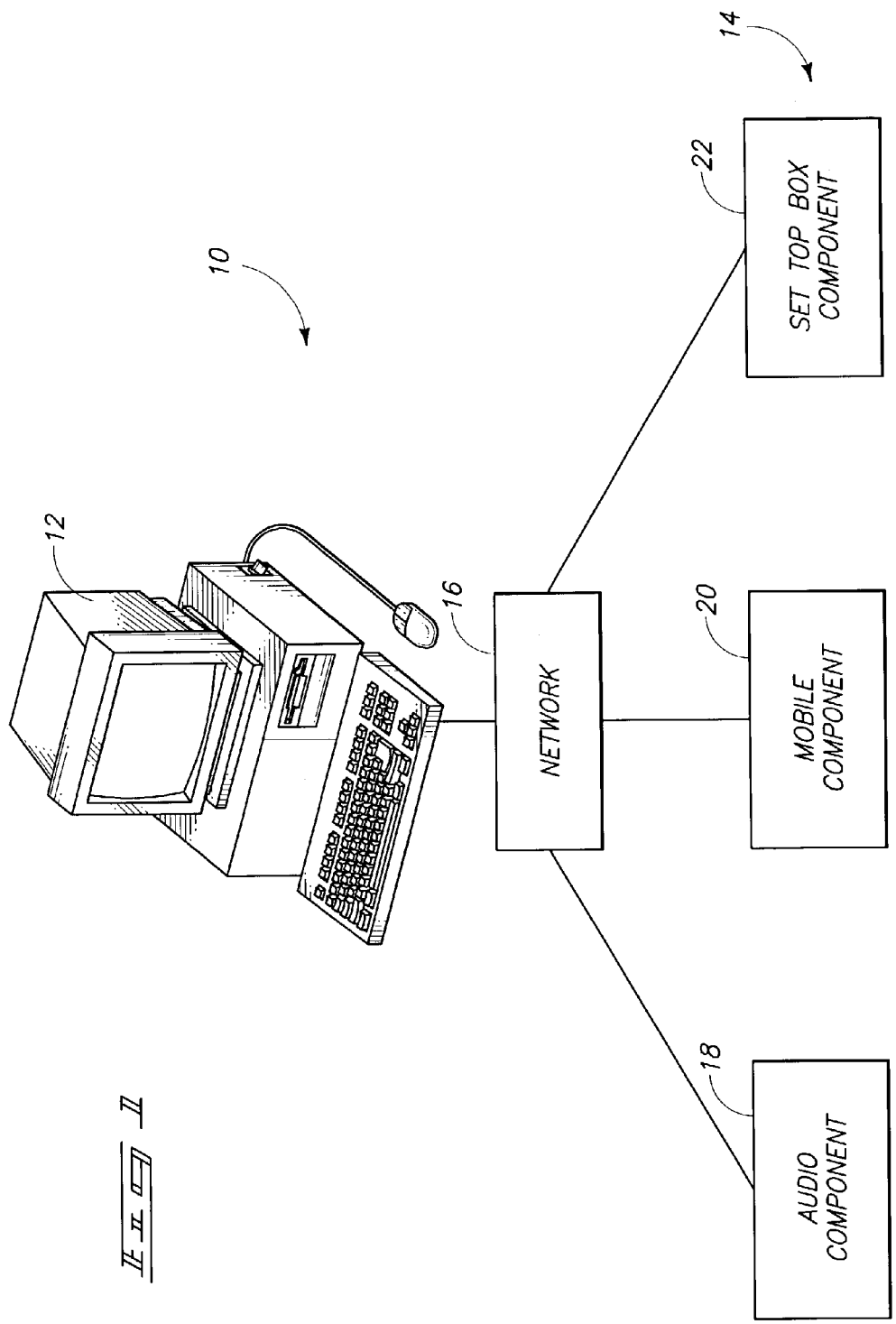

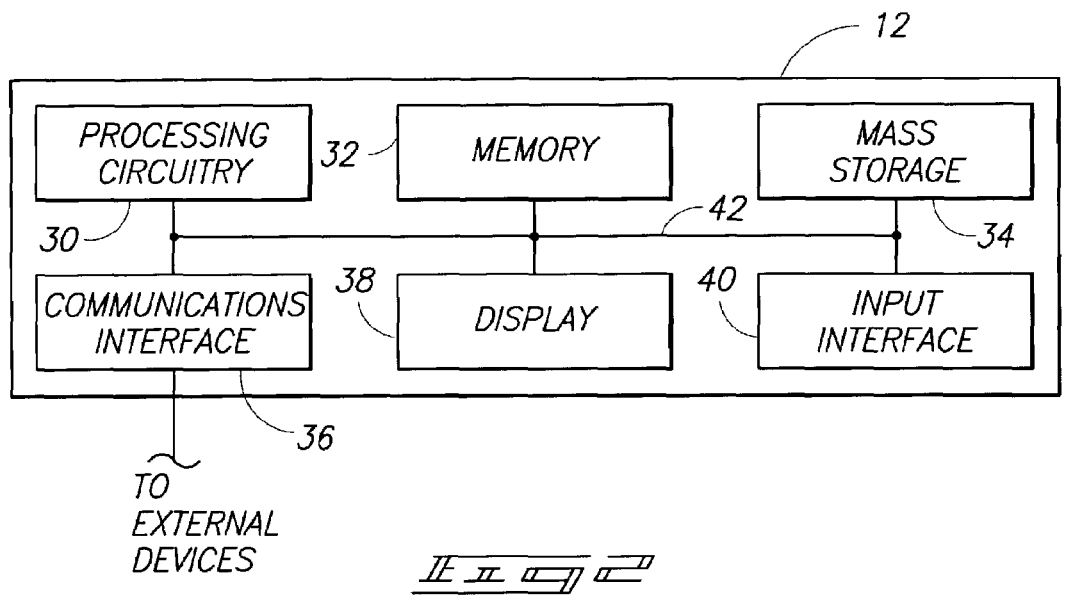
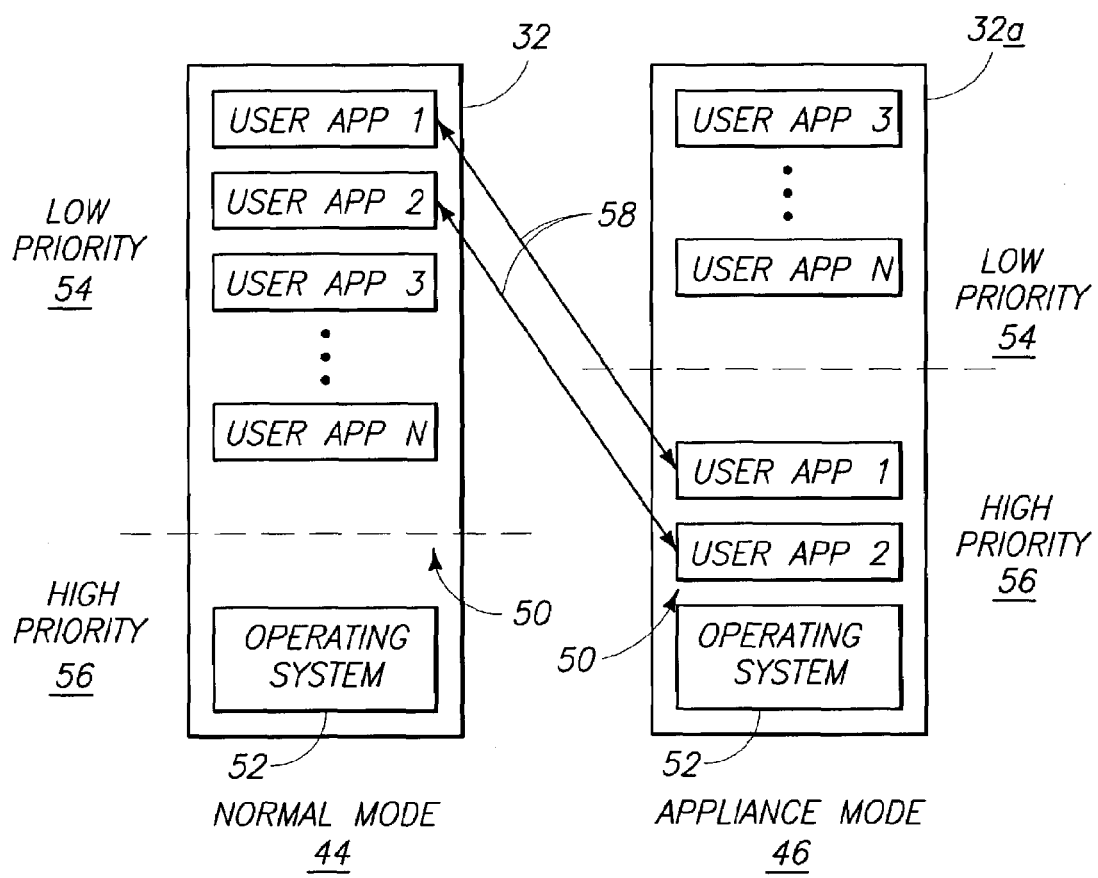

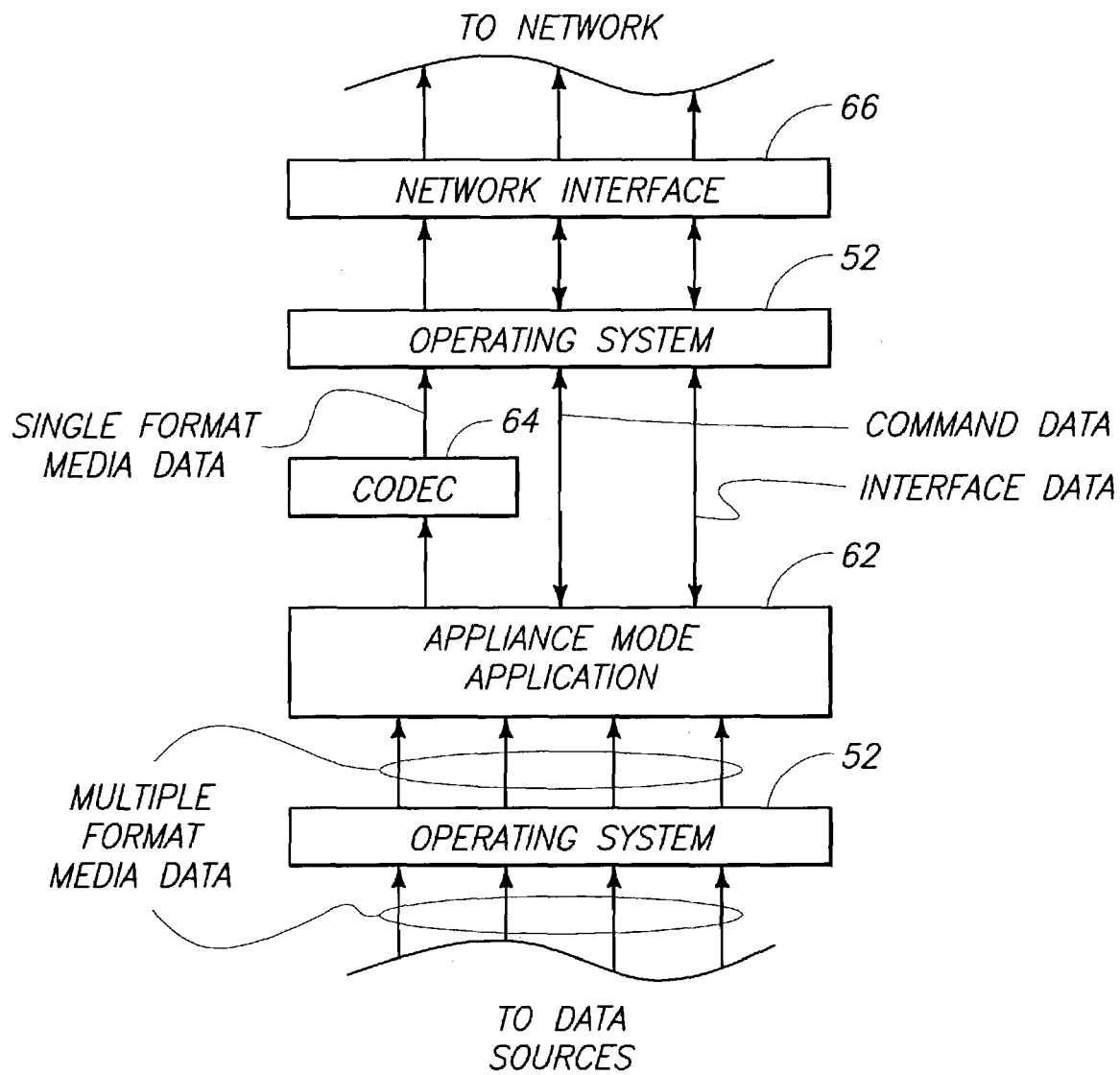

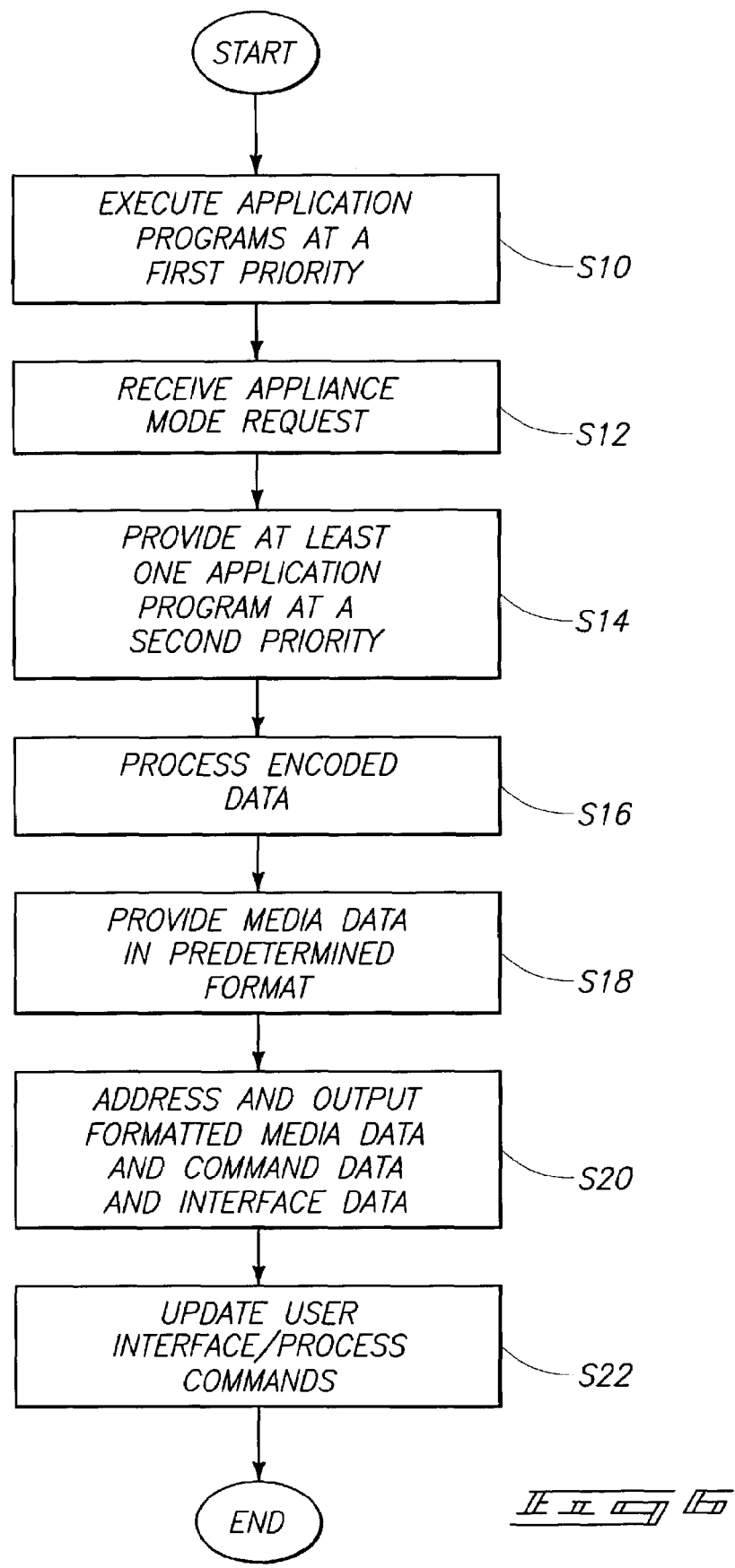

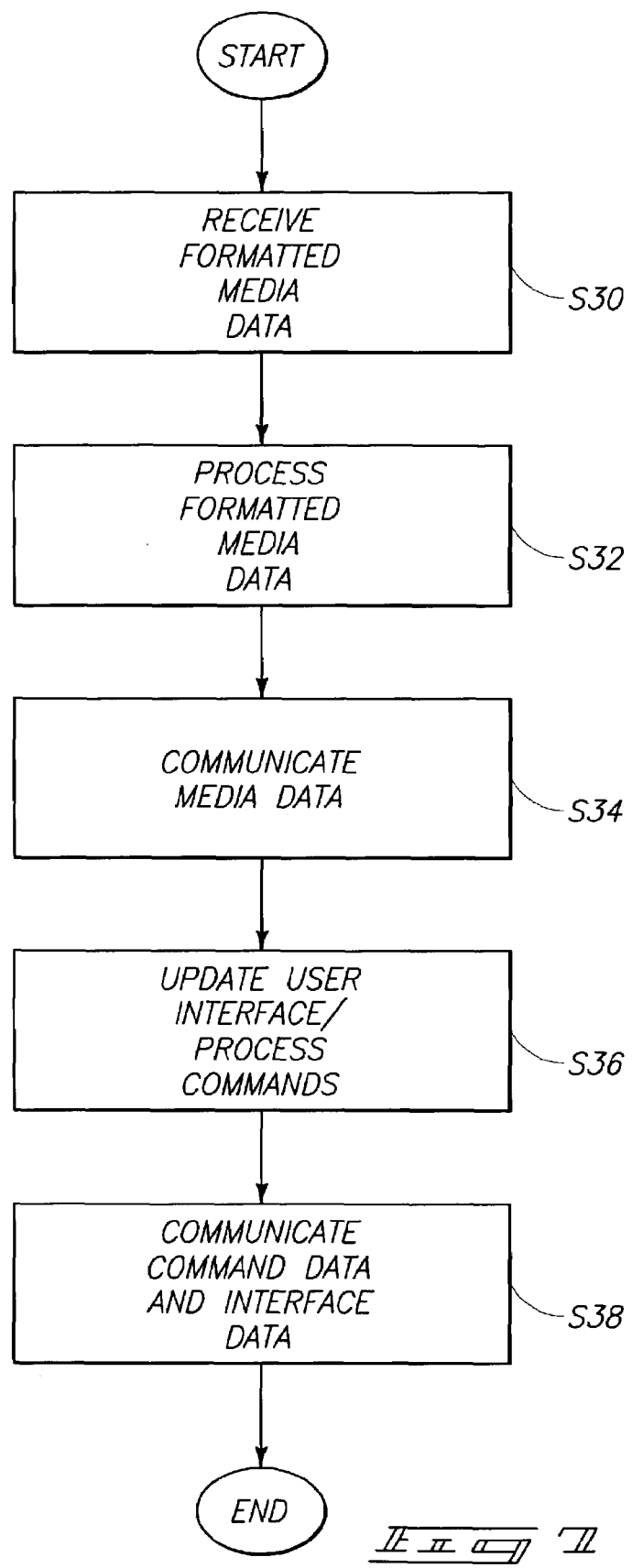

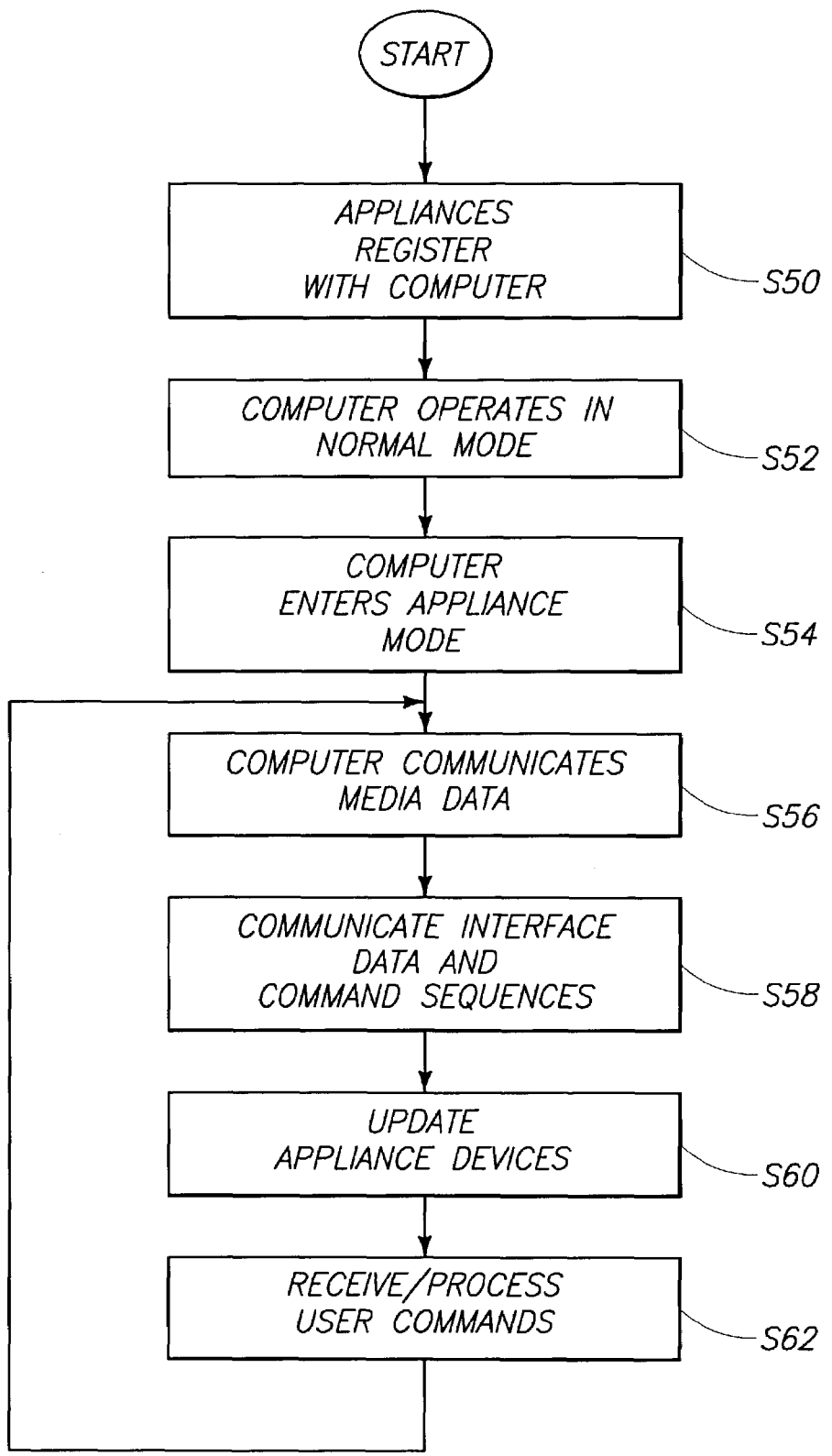

DIGITAL MEDIA DISTRIBUTION METHODS, GENERAL PURPOSE COMPUTERS, AND DIGITAL MEDIA DISTRIBUTION SYSTEMS

FIELD OF THE INVENTION

Aspects of the invention relate to digital media distribution methods, general purpose computers, and digital media distribution systems.

BACKGROUND OF THE INVENTION

General purpose computers, such as personal computers (PCs), are ubiquitous in homes, schools and the workplace. The number of tasks and capabilities performed by general purpose computers continues to increase with improvements in memory capacity, processing speeds, and other hardware and software improvements. Provision of audio data and video data in digital formats, as well as improvements in networking architectures (e.g., the public internet), have also increased the multi-media capabilities of general purpose computers. For example, general purpose computers now perform additional functions including implementing external (e.g., networked) communications and audio/video playback in addition to traditionally performed operations, such as word processing and execution of other similar applications.

More recently, small personal information appliances have been introduced to provide digital processing devices with networking capabilities in relatively inexpensive and portable hardware packages. For example, Audrey systems introduced by 3Com Corporation and I-Opener introduced by Netpliance, Inc. were designed to connect directly to the public Internet offering some functionality traditionally provided by personal computers. For example, Audrey units were designed to include email capabilities as well as provide a wireless keyboard and a built-in modem, microphone and speakers. The Audrey systems were designed to work with a variety of Internet service providers. However, to date, small personal information appliances have not been readily accepted in the marketplace due to various drawbacks including utilization of unreliable wireless networking platforms, such as Third Generation Mobile Systems (3G). Further, some personal computer prices have dropped to levels of the small personal information appliances.

Additional consumer digital media devices have also been introduced which include a standalone box which can play compact disks, DVDs, streaming audio, and streaming video. The premise behind these products is offering a choice of web content in a familiar and simple product (e.g., similar to a VCR). These devices have associated drawbacks including requiring purchase of entire hardware platforms which are relatively inflexible with respect to upgradeability.

Aspects of the present invention provide improved methods and apparatus for disseminating digital data.

SUMMARY OF THE INVENTION

Aspects of the invention relate to digital media distribution methods, general purpose computers, and digital media distribution systems.

According to one aspect, a digital media distribution method comprises providing a general purpose computer configured to execute a plurality of application programs according to a first priority level, executing one of the application programs according to a second priority level using the general purpose computer, wherein the second priority level is higher than the first priority level and the executing comprises executing to process encoded data of at least one of a plurality of media formats to provide media data, providing the media data within a predetermined media format using the general purpose computer, and outputting the media data of the predetermined media format from the general purpose computer for communication to a plurality of media appliance devices configured to process the media data of the predetermined media format.

According to another aspect of the invention, a general purpose computer comprises circuitry configured to execute a plurality of application programs at a first priority level at a first moment in time, to execute one of the application programs at a second priority level greater than the first priority level at a second moment in time to process encoded data of at least one of a plurality of media formats providing media data, and to provide the media data within a predetermined media format and an interface configured to output the media data of the predetermined media format externally of the general purpose computer for communication to a plurality of media appliance devices.

Other aspects of the invention are disclosed herein as is apparent from the following description and figures.

DESCRIPTION OF THE DRAWINGS

FIG. 1 is an illustrative representation of an exemplary digital media distribution system.

FIG. 2 is a functional block diagram of an exemplary general purpose computer.

FIG. 3 is an illustrative representation of exemplary allocations of memory resources of a general purpose computer.

FIG. 4 is an illustrative representation of an exemplary arrangement of executable code of a general purpose computer.

FIG. 6 is a flow chart of an exemplary methodology performed by a general purpose computer.

FIG. 7 is a flow chart of an exemplary methodology performed by an appliance device.

FIG. 8 is a flow chart illustrating operations performed by a general purpose computer and appliance devices.

DETAILED DESCRIPTION OF THE INVENTION

Figure 5:
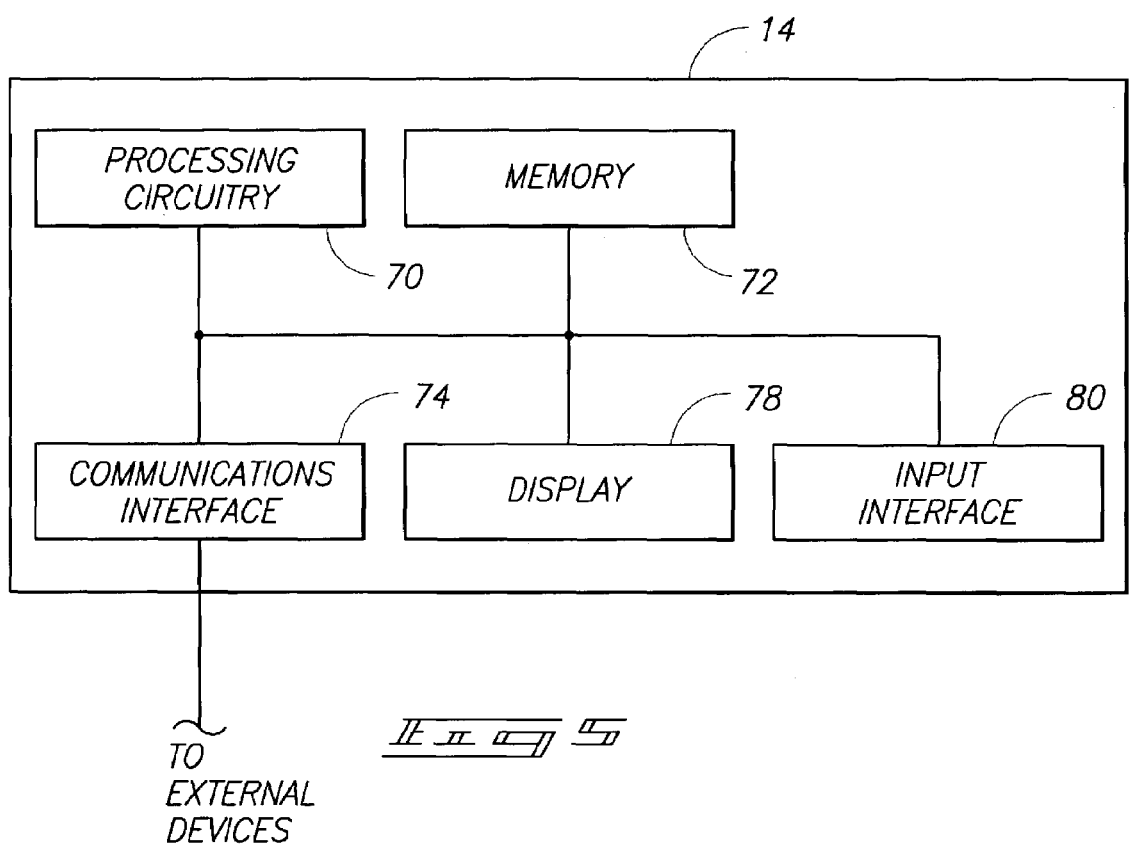
FIG. 5 is a functional block diagram of an exemplary appliance device.

As described herein, exemplary aspects of the invention provide a general purpose computer configured to execute a plurality of different software personalities to communicate digital media data to a plurality of relatively simple task-specific appliance devices corresponding to respective personalities of the host computer. Media data may be formatted and communicated from the general purpose computer operating in a respective personality to corresponding respective appliance devices. Exemplary personalities include an audio personality for music listening, Internet personality for browsing and/or e-mail, and an audio/video personality for audio/video playback (e.g., MPEG). Aspects of the invention permit the functions or operations of the general purpose computer to be upgradeable by downloading software while taking advantage of relatively inexpensive appliance devices configured to decode media data provided in a common predetermined format for subsequent communication to a user. Exemplary upgradeability includes capabilities to process new media formats, new user interface skins for the computer or appliance devices, new features, and data sharing (e.g., files can be easily shared from a general purpose computer). In addition, a user enjoys the expanded use of the investment in their general purpose computer. Additional aspects of the invention enable a home consumer or other user of digital media to enjoy the flexibility of a desktop general purpose computer to install new functionality or features for enjoying digital text, graphics, music, images and video in conjunction with the reliability and user-friendliness of fixed hardware appliance devices. Accordingly, relatively simple appliance devices may be utilized while retaining the flexibility of the general purpose computer. In addition, media selection, data access, processing, control and playback are implemented using a distributed system as described below according to exemplary aspects of the invention.

Referring to FIG. 1, an exemplary digital media distribution system 10 is shown. The exemplary system 10 includes a general purpose computer 12, a plurality of appliance devices 14, and a network 16. Network 16 is arranged to implement bidirectional communications between general purpose computer 12 and appliance devices 14. Network 16 may be embodied as a wired or wireless (e.g., Bluetooth) network, for example, within a home, residence, workplace or other environment.

The illustrated general purpose computer 12 may be implemented as a desktop personal computer (PC), for example, available from Hewlett-Packard Company. General purpose computer 12 may be also arranged to implement communications with another network (not shown), such as a private and/or public network (e.g., the public Internet), in addition to network 16.

According to exemplary implementations, digital media distribution system 10 may be implemented within a residential environment, home environment, workplace environment, educational environment, or other environment wherein the distribution of digital media data is desired. As described further below, general purpose computer 12 includes a plurality of software personalities (e.g., music listening, Internet, audio/video playback) which configure computer 12 to disseminate various respective forms of digital media data to appliance devices 14. Exemplary digital media data includes audio data, audio/video data, and Internet data (e.g., Web sites, email) corresponding to personalities of computer 12. Other forms of media data may be disseminated within system 10.

Appliance devices 14 are configured in at least one embodiment to communicate different respective forms of media data to users according to the operating personality of general purpose computer 12. Appliance devices 14 may perform different operations corresponding to the individual respective arrangements of the devices. Appliance devices 14 may be individually specialized for one particular purpose or configured for a plurality of functions.

For example, exemplary appliance devices 14 include audio components 18, mobile or control components 20, and set-top box components 22 in an exemplary configuration. Audio components 18 are configured to provide audio media data in a proper format for communications to an associated pre-amplifier or amplifier (not shown). Mobile components 20 may be implemented as one or more of an interface appliance, control appliance, and/or media appliance. For example, an interface appliance may include a display to replicate a user interface of the general purpose computer 12 and a data entry device, such as a keyboard. In another example, mobile components 20 may include a personal digital assistant (PDA) to provide bidirectional communications with computer 12 and may communicate user commands, for example, to computer 12. Commands may be communicated to computer 12 as command or control data to control operations of computer 12 including the execution of application programs. For example, commands may include commands to stop, begin or skip tracks relative to communication of media data from computer 12 to appliance devices 14. Computer 12 may alter the execution of an application program responsive to receiving command or control data from devices 14. In addition to control operations, mobile components 20 may have media communication capabilities (e.g., a music listening mode) and interface appliance capabilities such as a display for communicating information to a user. Set-top box components 22 are arranged to receive video/audio media data from computer 12 and provide the media data in an appropriate format for communication to a user via, for example, an associated television. The depicted appliance devices 14 are exemplary and other configurations are possible.

In one configuration, processing operations (e.g., audio processing, selection, Internet streaming, decoding operations) are performed by computer 12 enabling appliance devices 14 to be implemented as relatively simple hardware devices. Media data may be communicated within system 10 according to one predetermined format as described below (as opposed to the numerous different formats in which the media data may be provided) which also reduces the hardware implemented within associated appliance devices 14. Additional details regarding appliance devices 14 are described below.

As mentioned above, network 16 may implement wired or wireless communications with devices 12, 14. Network 16 may also be arranged in a hybrid arrangement wherein some of devices 14 communicate with computer 12 via a wireless medium (e.g., radio frequency or infrared) and others of the devices 14 communicate via a wired connection.

Referring to FIG. 2, an exemplary general purpose computer 12 arranged as a personal computer is shown. The exemplary computer 12 includes processing circuitry 30, a memory 32, a mass storage 34, a communications interface 36, a display 38 and an input interface 40. A bus 42 is arranged to implement appropriate communications between the illustrated components.

Processing circuitry 30 is arranged to execute software, firmware or other appropriate instructions to implement or control desired operations of computer 12. In one possible arrangement, processing circuitry 30 is implemented as a microprocessor, such as a Pentium™ processor, available form Intel Corporation.

Memory 32 is arranged to store digital data and code or instructions which are executable by processing circuitry 30. Exemplary memory 32 is implemented as random access memory (RAM), read only memory (ROM), flash memory, etc.

Mass storage 34 may be implemented as a hard disk and associated drive components, a floppy disk and appropriate drive components, and/or an optical disk and appropriate drive components. Mass storage 34 is arranged to store relatively large amounts of digital data such as programming comprising executable instructions (e.g., application programs, operating system, etc.) usable by processing circuitry 30, and media data or encoded data to be processed and communicated within media distribution system 10. Memory 32 and/or mass storage 34 may be referred to as articles of manufacture comprising processor-usable media.

Communications interface 36 is arranged to couple with devices external of computer 12. For example, communications interface 36 may implement bi-directional communications with network 16 in one arrangement. Additionally, communications interface 36 may implement communications with other networks, such as another private and/or public network (e.g., the public Internet). Communications interface 36 may implement communications using a wired or wireless medium in exemplary configurations.

Display 38 conveys visual information to a user. Display 38 may be configured as a CRT monitor, thin-film transistor display, liquid crystal display (LCD), or other appropriate structure capable of depicting user interfaces (e.g., graphical user interfaces) for a user.

Input interface 40 receives user actions for controlling operations of system 10 or general purpose computer 12, for inputting data, etc. Exemplary input interfaces 40 include a keyboard, mouse, joy stick or other structure capable of receiving actions from a user.

Referring to FIG. 3, allocation of resources of memory 32, 32a are described with reference to operations of computer 12 at different moments in time in a normal mode 44 and an appliance mode 46, respectively. During operations in normal mode 44, processing circuitry 30 operates to execute instructions of a plurality of user application programs 50 and an operating system 52. Exemplary user application programs 50 include a compact disc player, a music jukebox, internet browser, DVD player, word processing application, spreadsheet application or other application. Operating system 52 operates to control and manage operations of computer 12 and may be implemented using MS-DOS™ and Windows XP™ available from Microsoft Corporation.

During operations of computer 12 in normal mode 44, user application programs 50 may be executed according to a low priority 54 while operating system 52 may be executed according to a high priority 56. Entities executed within high priority 56 take precedence over entities executed within low priority 54. For example, processing circuitry 30 devotes more processing operations (i.e., cycles) to entities within high priority 56 versus entities within low priority 54.

FIG. 3 also depicts appliance mode 46 wherein one or more user application program 50 is assigned and executed according to high priority 56. Accordingly, additional resources of computer 12 including processing time of processing circuitry 30 are devoted to user application programs 50 provided within high priority 56 compared with processing of user application programs 50 within low priority 54.

User application programs 50 within high priority 56 may be considered to run inside or correspond to respective personalities of general purpose computer 12. The software or firmware personalities consist of special operating modes which may be selected by a user. The particular application program(s) 50 operating within the high priority 56 correspond to the personality of computer 12 at a particular moment in time (e.g., music listening, Internet, audio/video, etc.). Computer 12 uses the application programs 50 in high priority 56 to provide media data to appliance devices 14 corresponding to the respective personalities. The application programs 50 are run within high priority 56 according to one exemplary embodiment during appliance mode operations to minimize or eliminate disruptions in the media data provided to appliance devices 14. Application programs 50 operating within the high priority 56 operating mode are operated in a special process security level insulated from other processes of general purpose computer 12. Execution of application programs 50 within high priority 56 insulate the respective personalities from errors that might occur in other processes/application programs 50, for example, being executed within low priority status 54. In one example, interrupts which are applied to processing circuitry 30 during execution of an application program 50 at low priority 54 may be masked during execution of the application program 50 at high priority 56. Switching an application 50 from low priority 54 to high priority 56 (e.g., execution as a personality) may change a desktop user interface being depicted using display 38, for example, providing a new virtual desk.

Application programs 50 which run in high priority 56 may be restricted. For example, in a music listening personality, computer 12 may run only one application program 50 (e.g., a music jukebox which can play CDs, MP3 files, or any other audio format). As described further below, the general purpose computer 12 communicates the media data to appliance devices 14 which have been advertised as "music listening" clients. In other personalities, a plurality of application programs 50 may be executed in high priority 56. In an exemplary Internet personality, computer 12 may execute a web browser application program and an email application program.

General purpose computer 12 is arranged to implement bridging operations illustrated as reference 58 when application programs 50 are switched from low priority 54 in normal mode 44 to high priority 56 in appliance mode 46. For example, an application program 50 that runs inside a particular personality in high priority 56 of appliance mode 46 may also run in low priority 54 during operations in normal mode 44. Exemplary operations of the application program 50 in the normal mode 44 enable a user to download files (e.g., from the public Internet) and select files to play (e.g., listening to music) during normal mode 44. Then the user may switch operations to a "music listening" personality in appliance mode 46 wherein files which were downloaded and selected during operations in the normal mode 44 (or otherwise arranged) may be played or otherwise processed during operations of the application program 50 in the "music listening" or other selected personality in appliance mode 46. The processed media data (e.g., music data) may be directed to appliance devices 14 which are "music listening" appliances. Accordingly, the application program 50 operating as a "music listening" personality may direct processed output media data to respective appliance devices 14 using a playlist which was arranged during operations in the normal mode 44. Bridging operations 58 allow setup, configuration, media browsing, searching, and selection during normal mode 44 operations and playback or other media consumption in appliance mode 46.

Aspects of the invention also enable software and firmware of general purpose computer 12 and appliance devices 14 to be easily upgraded or updated. For example, updates to application programs 50 or operating system 52 may be received and stored using mass storage 34. In an exemplary arrangement, communications interface 36 may be utilized to download software or other code from an appropriate website, such as a site corresponding to an appliance manufacturer or the provider of the applications programs. Firmware executed by respective appliance devices 14 may be upgradeable by downloading new interface skins or other features from general purpose computer 12 to the respective devices 14. Alternatively, some configurations of appliance devices 14 may be sufficiently inexpensive to be discarded and replaced when desired (e.g., MP3 decoders).

Referring to FIG. 4, a plurality of software components is illustrated to depict exemplary media data processing and communication operations of computer 12. The illustrated exemplary components include operating system 52, an appliance mode application program 62, a codec 64 and a network interface 66. FIG. 4 depicts exemplary operations of computer 12 in the appliance mode 46 wherein one of user application programs 50 is executed according to a high priority level and is referred to as appliance mode application program 62. One or more of the illustrated software components may be implemented as hardware in other exemplary configurations.

Operating system 52 is arranged to interface with various data sources including, for example, mass storage 34, memory 32 and/or communications interface 36. Operating system 52 operates to receive media data encoded within a plurality of different formats from the data sources. For example, the media data may be encoded in exemplary formats including MPEG1, 2, 4, MP3, RealVideo, Windows Media, Microsoft Video, QuickTime, etc. Operating system 52 is arranged to access the multiple formatted media data and present such data to appliance mode application program 62.

Appliance mode application program 62 is arranged to process received data encoded in one of the plurality of different formats for use within media distribution system 10. In one exemplary arrangement, the appliance mode application program 62 processes encoded data to provide the media data. Accordingly, in one exemplary arrangement, appliance mode application program 62 is arranged to decode data including media content and received within one or more media format. The decoded data comprises media data which is outputted to codec 64.

Codec 64 operates to further process data to be communicated to appliance devices 14. For example, codec 64 may decode or decompress any encoded data which was not decoded via application program 62 to provide additional media data. As mentioned previously, communications between computer 12 and appliance devices 14 occur according to a predetermined format corresponding to the personality of computer 12. Codec 64 additionally operates to encode or compress the media data according to the predetermined media format corresponding to the respective personality of computer 12 in at least one embodiment. In other arrangements, no compression is provided and the media data is communicated directly to appliance devices 14.

According to one exemplary embodiment, the data stream provided by computer 12 to appliance devices 14 is fixed corresponding to the personality of computer 12 at the moment in time. For example, when computer 12 operates in a video playing personality, the appliance mode application program 62 and codec 64 operate to provide media data in a predetermined format for decoding using appliance devices 14 which are arranged to implement audio and video playback functionality. As described, computer 12 is configured to convert video media data encoded using a plurality of formats (e.g., QuickTime, RealVideo, MPEG 1, Microsoft Video, etc.) to a predetermined format (e.g., MPEG-2).

As mentioned above, codec 64 may decode any formatted data which appliance mode application program 62 was unable to process or decode. Accordingly, the media data either decoded within appliance mode application program 62 or within codec 64 is encoded according to the predetermined media format using codec 64 for communication within system 10.

Appliance devices 14 (not shown in FIG. 4) are arranged to receive media data of the predetermined media format from network 16, to process the formatted data to extract the media data from the predetermined media format (e.g., using decoding operations) and to communicate the extracted media data to a user. Accordingly, multiple format data is provided from one or more data source and processed by computer 12 to provide media data in a single format for use within system 10. Provision of the media data within a single format enables utilization of relatively simple appliance devices 14 in one configuration.

Following formatting operations of codec 64, operating system 52 accesses the formatted media data and assembles the media data for communication within network 16. For example, the operating system 52 may format the media data for communication according to the communications protocol of network 16 (e.g., providing media data in packets). Further, operating system 52 may operate to address or identify the media data (e.g., utilizing a token) to communicate the media data to appropriate media appliances 14 which correspond to the personality of computer 12 providing the media data.

Network interface 66 is arranged to control the processing circuitry 30 to access the media data from operating system 52 and to communicate or output the media data to the network 16 according to the communications protocol of network 16.

As described previously, additional aspects of the invention provide communication of command data and/or interface data intermediate computer 12 and appliance devices 14. Command data and interface data may be communicated to appliance devices 14 from computer 12, or alternatively, communicated to computer 12 from appliance devices 14. Command or control data may include commands to be communicated between computer 12 and devices 14. As described above, the command or control data communicated to computer 12 from an appliance device 14 may include user inputted commands, such as stop, or commence audio or video playback.

Display 38 of computer 12 may be utilized to depict a user interface (e.g., GUI) corresponding to the execution of appliance mode application program 62. During the execution of program 62, changes to the displayed user interface may be appropriate. Processing circuitry 30 may operate to control display 38 internally of computer 12 to effect such changes. If equipped with appropriate hardware (e.g., a display), appliance devices 14 may also depict a user interface which corresponds to the user interface of computer 12. Interface data may be outputted from computer 12 to appliance devices 14 to effect changes in the user interfaces depicted using one or more appliance device 14. In one aspect, the user interfaces depicted using computer 12 and appliance devices 14 are the same or preferably resemble one another to provide familiar user interfaces to the user.

In the illustrated exemplary configuration, operating system 52 is able to access command data and interface data for communication between appliance devices 14 and computer 12 via network interface 66. Exemplary communication techniques of interface data are described in co-pending U.S. application Ser. No. 10/232,443, filed Aug. 29, 2002, entitled "Application Program Sharing Systems, Processing Devices And Application Program Sharing Methods", listing Ullas Gargi as inventor, the teachings of which are incorporated herein by reference. The incorporated teachings provide relatively low bandwidth transmission of interface data between remotely located devices.

According to additional exemplary operational aspects, a format of a user interface depicted using display 38 may be altered between normal and appliance modes. For example, following the entry into appliance mode, processing circuitry 30 may change the format of the user interface presented by display 38 to more closely resemble the user interfaces generated by appliance devices 14 or facilitate communication of the user interfaces to appliance devices 14.

Referring to FIG. 5, an exemplary configuration of hardware components of appliance device 14 is shown. The illustrated exemplary appliance device 14 includes processing circuitry 70, memory 72, a communications interface 74, a display 78, and an input interface 80.

Processing circuitry 70 is arranged to execute software, firmware or other appropriate instructions to implement or control desired operations of device 14. In one exemplary arrangement, processing circuitry 70 is arranged to decode media data encoded according to a predetermined format. The decoded media data may be outputted to an associated device (e.g., stereo amplifier, television, etc.) for communication to a user. In other arrangements, data communicated from computer 12 may comprise the actual media data without encoding or compression.

Memory 72 is arranged to store digital data and code or instructions executable by processing circuitry 70. Exemplary memory 72 is implemented as random access memory (RAM), read only memory (ROM), flash memory, etc. In one arrangement, memory 72 buffers data received from computer 12 for processing by circuitry 70.

Communications interface 74 is arranged to couple with devices external of appliance device 14. For example, communications interface 74 may implement bidirectional communications with network 16 in one arrangement. In addition, communications interface 74 may provide media data decoded by device 14 to the associated devices for communication of the media data to a user.

Display 78 conveys visual information to a user. Display 38 may be configured as a liquid crystal display (LCD) or other appropriate structure capable of depicting user interfaces (e.g., GUIs) to a user.

Input interface 80 receives user actions for controlling operations of appliance device 14, for inputting data, for inputting commands, etc. Exemplary input interfaces 80 include a keyboard, mouse, joy stick or other structure capable of receiving actions from a user.

As described above, appliance devices 14 may be implemented in a plurality of different configurations corresponding to the respective functionality of the device. One or more of the depicted exemplary components may be omitted for one or more of devices 14 in an effort to provide appliance devices 14 of simplistic design and reduced complexity. For example, an appliance device 14 arranged as an exemplary audio component 18 may include a input interface 80 arranged to receive user inputs with respect to audio functionality (e.g., volume, balance, tone, etc.) without providing a display 78 or graphical user interface.

An appliance device 14 arranged as a mobile component 20 may include input interface 80 including a keypad to receive user inputs which may also be applied to computer 12. The mobile component 20 may also include display 78 to communicate a user interface to a user.

A mobile component 20 configured as an Internet appliance may provide display 78 to depict the web browser executed using computer 12. The Internet appliance may additionally include input interface 80 to receive commands from a user to implement control of browsing operations of the public Internet.

An appliance device 14 arranged as a set top box component 22 may include input interface 80 arranged to provide appropriate controls for a user to effect operations with respect to video playback. Other configurations of appliance devices 14 are contemplated and may be utilized to implement aspects described herein.

Referring to FIG. 6, an exemplary methodology executable by processing circuitry 30 of general purpose computer 12 is shown. The depicted methodology illustrates exemplary aspects of the invention and alternative methodologies are possible including more, less or alternative steps.

Initially, at a step S10, the processing circuitry executes application programs as selected by a user-at a first priority level.

At a step S12, an appliance mode request for one or more application program is received.

At a step S14, the processing circuitry operates the computer in the appliance mode and one or more selected application program is executed within a second priority level to implement one or more appropriate personality to distribute media data within the system.

At a step S16, the processing circuitry encoded data is decoded or otherwise processed to provide media data.

At a step S18, the media data is provided or encoded into a predetermined format.

At a step S20, the media data provided in the predetermined format is addressed and outputted to appropriate appliance devices corresponding to the operating personality of the general purpose computer. Any command data and interface data is also communicated.

At a step S22, any command data and interface data received from devices 14 is processed and implemented.

Referring to FIG. 7, exemplary operations of an appliance device 14 of the media distribution system 10 are shown. Processing circuitry 70 of a respective appliance device 14 is arranged to perform the illustrated methodology in at least one embodiment. Alternative methodologies are possible including more, less or alternative steps.

At a step S30, media data encoded according to the predetermined format is received from the general purpose computer and network.

At a step S32, the processing circuitry of the appliance device proceeds to process the formatted media data which may include decoding the encoded media data.

At a step S34, the appliance device operates to communicate the media data to a user depending upon the respective configuration of the appliance device.

At a step S36, the processing circuitry updates the user interface responsive to any received interface data and also process any commands received from the computer.

At a step S38, processing circuitry controls the appliance device to communicate any appropriate command data or interface data to the general purpose computer responsive to received user inputs or user effected changes to a user interface.

Referring to FIG. 8, exemplary operations and interfacing of computer 12 and appliance devices 14 are described.

At a step S50, the general purpose computer and appliance devices are powered up and the appliance devices register with the computer to indicate respective appliance device type (control, media, Internet, etc.), user interface details, capabilities, media types and other appropriate information.

At a step S52, the computer operates in a normal mode and may execute application programs at a first or normal priority level.

At a step S54, a user switches operations of the computer to appliance mode. One or more application program is placed into a second or high priority mode and the codec is initialized to process data corresponding to the selected personality of the computer in the appliance mode. Bridging operations described above between normal mode and appliance mode are implemented.

At a step S56, media data is encoded according to the predetermined format by the general purpose computer and streamed to appropriate appliance devices registered for the respective media type corresponding to the personality of the computer.

At a step S58, interface data and command sequences are communicated or exchanged between the computer and appropriate appliance devices.

At a step S60, appliance devices are updated including registering new appliance devices and de-registering deactivated appliance devices.

At a step S62, a user may communicate commands to the computer to control the application program of the high priority using a control appliance device. Execution of steps S56-S62 may be repeated during the operation of the computer in the appliance mode.

The protection sought is not to be limited to the disclosed embodiments, which are given by way of example only, but instead is to be limited only by the scope of the appended claims.

What is claimed is:

1. A digital media distribution method comprising:
   providing a general purpose computer configured to execute a plurality of application programs according to a first priority level;
   executing one of the application programs according to a second priority level using the general purpose computer, wherein the second priority level is higher than the first priority level and the executing comprises executing to process encoded data of at least one of a plurality of media formats to provide media data;
   providing the media data within a predetermined media format using the general purpose computer; and
   outputting the media data of the predetermined media format from the general purpose computer for communication to a media appliance device configured to process the media data of the predetermined media format.

2. The method of claim 1 further comprising receiving updated executable code for the one of the application programs, and configuring the general purpose computer to execute the updated executable code to execute the one application program.

3. The method of claim 1 further comprising bridging execution of the one application program using the general purpose computer between the first priority level and the second priority level.

4. The method of claim 1 wherein the bridging comprises arranging the encoded data during execution of the one application program at the first priority level.

5. The method of claim 1 further comprising depicting a user interface using the general purpose computer during the executing, and outputting interface data for communication to the media appliance device and usable by the media appliance device to depict another user interface corresponding to the user interface depicted using the general purpose computer.

6. The method of claim 1 further comprising depicting a user interface using the general purpose computer during the executing, and altering a format of the depicted user interface corresponding to execution of the one application program according to the first and second priority levels.

7. The method of claim 1 wherein the executing the one of the application programs comprises masking interrupts to processing circuitry of the general purpose computer which are not masked during execution according to the first priority level.

8. The method of claim 1 wherein the application programs are configured to process encoded data of a plurality of respective media formats, and the predetermined media format comprises one of the respective media formats.

9. The method of claim 1 wherein the processing of the encoded data and the providing the media data comprise converting the media data from a first format to the predefined media format.

10. The method of claim 1 wherein the executing comprises executing to decode the encoded data and the providing the media data comprises encoding the media data.

11. The method of claim 1 wherein the providing the media data comprises encoding the media data using the predetermined media format different than the at least one media format.

12. The method of claim 1 further comprising receiving control data within the general purpose computer from the appliance device, and altering the executing of the one application program using the general purpose computer responsive to the receiving.

13. The method of claim 1 further comprising allocating an increased amount of resources of the general purpose computer for executing the one of the application programs during the executing of the one of the application programs according to the second priority level compared with execution of the one of the application programs according to the first priority level.

14. The method of claim 1 further comprising allocating an increased amount of processing time of the general purpose computer for executing the one of the application programs during the executing of the one of the application programs according to the second priority level compared with execution of the one of the application programs according to the first priority level.

15. The method of claim 1 wherein the executing to process the encoded data comprises decoding the encoded data to provide the media data, and wherein the providing the media data within the predetermined format comprises providing the media data during the executing of the one of the application programs according to the second priority level.

16. The method of claim 1 wherein the outputting comprises outputting the media data from the general purpose computer for communication to the media appliance device and a plurality of additional media appliance devices.

17. A general purpose computer comprising:
    circuitry configured to execute a plurality of application programs at a first priority level at a first moment in time, to execute one of the application programs at a second priority level greater than the first priority level at a second moment in time to process encoded data of at least one of a plurality of media formats providing media data, and to provide the media data within a predetermined media format; and
    an interface configured to output the media data of the predetermined media format externally of the general purpose computer for communication to a media appliance device.

18. The computer of claim 17 wherein the circuitry is configured to receive updated executable code for the one application program and the circuitry is configured to execute the updated executable code at the second priority level.

19. The computer of claim 17 wherein the circuitry is configured to arrange the encoded data during execution of the one application program at the first priority level.

20. The computer of claim 17 further comprising a display configured to depict a user interface corresponding to the execution of the one application program at the second priority level, and the interface is configured to output interface data externally of the general purpose computer configured to cause the media appliance device to depict another interface corresponding to the user interface depicted using the display.

21. The computer of claim 17 wherein the circuitry comprises a microprocessor.

22. The computer of claim 17 wherein an interrupt to the microprocessor is masked during execution of the one application program at the second priority level which is not masked during the execution of the application programs at the first priority level.

23. The computer of claim 17 wherein the circuitry is configured to decode the encoded data to process the encoded data and to encode the media data according to the predetermined media format to provide the media data within the predetermined media format.

24. The computer of claim 17 wherein the circuitry is configured to execute a general purpose computer operating system at the second priority level.

25. The computer of claim 17 wherein the circuitry is configured to use an increased amount of resources of the circuitry during the execution of the one of the application programs at the second priority level compared with the execution at the first priority level.

26. The computer of claim 17 wherein the circuitry comprises processing circuitry, and wherein an increased amount of processing time of the processing circuitry is allocated for the execution of the one of the application programs at the second priority level compared with the execution at the first priority level.

27. The computer of claim 17 wherein the circuitry is configured to execute the one of the application programs at the second priority level to process the encoded data comprising decoding the encoded data and providing the media data.

28. The computer of claim 17 wherein the interface is configured to output the media data for communication to the media appliance device and a plurality of additional media appliance devices.

29. A general purpose computer comprising:
 means for executing a plurality of application programs according to a first priority level and for executing one of the application programs according to a second priority level greater than the first priority level to decode initial media data encoded according to at least one of a plurality of media formats to provide decoded media data;
 means for encoding the decoded media data according to a predetermined media format to provide encoded media data; and
 means for communicating the encoded media data to a media appliance device configured to process the encoded media data encoded according to the predetermined media format.

30. The computer of claim 29 wherein the means for executing the one of the application programs comprises means for executing updated executable code of the one application program.

31. The computer of claim 29 further comprising means for depicting a user interface including information relative to the execution of the one application program, and wherein the means for communicating comprises means for communicating interface data usable by the media appliance device to depict another user interface including information relative to the execution of the one application program.

32. A digital media distribution system comprising:
 a general purpose computer configured to execute a plurality of application programs at a first priority level at a first moment in time, to execute one of the application programs at a second priority level greater than the first priority level at a second moment in time to process encoded data of at least one of a plurality of media formats providing media data, to provide the media data within a predetermined media format, and to output the media data of the predetermined media format; and
 a media appliance device configured to receive the media data of the predetermined media format, to process the media data of the predetermined media format to extract the media data from the predetermined media format, and to communicate the extracted media data to a user.

33. The system of claim 32 wherein the general purpose computer is configured to receive a software update for the one application program, and to execute the one application program having the software update at the second priority level.

34. The system of claim 32 wherein the general purpose computer is configured to bridge execution of the one application program between the first and the second priority levels.

35. The system of claim 34 wherein the general purpose computer is configured to arrange the encoded data during execution of the one application program at the first priority level and to process the arranged encoded data during execution of the one application program at the second priority level.

36. The system of claim 32 wherein at least one interrupt of the general purpose computer is masked at the second priority level and is not masked at the first priority level.

37. The system of claim 32 wherein the general purpose computer is configured to encode the media data according to the predetermined media format to provide the media data within the predetermined media format.

38. The system of claim 32 wherein the general purpose computer is configured to execute the application programs at the first priority level to process encoded data of a plurality of different respective media formats and to provide the media data within the predetermined media format comprising one of the respective media formats.

39. The system of claim 32 wherein the media appliance device is configured to communicate control data to the general purpose computer, and the general purpose computer is configured to alter execution of the one application program responsive to the control data.

40. The system of claim 32 wherein the general purpose computer is configured to depict a user interface to communicate information regarding the execution of the one application program and to communicate interface data to the media appliance device, and wherein the media appliance device is configured to depict another user interface using the interface data.

41. The system of claim 40 wherein the general purpose computer is configured to alter a format of the user interface depicted using the general purpose computer responsive to a change in the execution of the one application program from the first priority level to the second priority level.

42. An article of manufacture comprising:
   processor-usable media comprising programming configured to cause processing circuitry of a general purpose computer to perform processing comprising:
      executing a plurality of application programs at a first priority level at a first moment in time;
      executing one of the application programs at a second priority level greater than the first priority level at a second moment in time to process encoded data of at least one of a plurality of media formats to provide media data;
      providing the media data within a predetermined media format; and
      controlling outputting of the media data of the predetermined media format externally of the general purpose computer for communication to a media appliance device.

43. The article of claim 42 wherein the processor-usable media comprises programming configured to cause the processing circuitry to allocate an increased amount of processing time of the processing circuitry for the executing of the one of the application programs at the second priority level compared with the first priority level.

* * * * *

UNITED STATES PATENT AND TRADEMARK OFFICE
CERTIFICATE OF CORRECTION

PATENT NO. : 7,383,356 B2  Page 1 of 1
APPLICATION NO. : 10/427310
DATED : June 3, 2008
INVENTOR(S) : Ullas Gargi It is certified that error appears in the above-identified patent and that said Letters Patent is hereby corrected as shown below:

In column 11, line 53, in Claim 4, delete "claim 1" and insert -- claim 3 --, therefor.

Signed and Sealed this

Seventh Day of July, 2009

JOHN DOLL
*Acting Director of the United States Patent and Trademark Office*